US010769516B2

(12) United States Patent
Hara et al.

(10) Patent No.: US 10,769,516 B2
(45) Date of Patent: Sep. 8, 2020

(54) INFORMATION PROCESSING APPARATUS, PROGRAM AND INFORMATION PROCESSING METHOD

(71) Applicant: International Business Machines Corporation, Armonk, NY (US)

(72) Inventors: Satoshi Hara, Tokyo (JP); Tetsuro Morimura, Tokyo (JP); Rudy Raymond Harry Putra, Kanagawa-ken (JP); Hidemasa Muta, Caulfield South (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 842 days.

(21) Appl. No.: 14/865,274

(22) Filed: Sep. 25, 2015

(65) Prior Publication Data

US 2016/0092782 A1 Mar. 31, 2016

(30) Foreign Application Priority Data

Sep. 26, 2014 (JP) .................................. 2014-196355

(51) Int. Cl.
*G06N 3/00* (2006.01)
*G08G 1/01* (2006.01)

(52) U.S. Cl.
CPC ........... *G06N 3/006* (2013.01); *G08G 1/0129* (2013.01); *G08G 1/0145* (2013.01)

(58) Field of Classification Search
CPC ............. G06N 5/04; G06N 3/006; G06N 3/00
See application file for complete search history.

(56) References Cited

U.S. PATENT DOCUMENTS

| 2008/0138773 A1* | 6/2008 | Lathrop | ............... G07F 17/32 434/72 |
| 2012/0203528 A1* | 8/2012 | Ikeda | ............... G06F 17/5009 703/8 |
| 2013/0173512 A1* | 7/2013 | Cantin | ............... G06N 3/12 706/13 |

FOREIGN PATENT DOCUMENTS

| JP | H02-114383 A | 4/1990 |
| JP | H07-021487 A | 1/1995 |
| JP | 2004-078482 A | 3/2004 |
| JP | 2005-182383 A | 5/2005 |

(Continued)

OTHER PUBLICATIONS

Gehrke, Jan D., and Janusz Wojtusiak. "Traffic prediction for agent route planning." International conference on computational science. (Year: 2008).*

(Continued)

*Primary Examiner* — Vincent Gonzales
*Assistant Examiner* — Kevin W Figueroa
(74) *Attorney, Agent, or Firm* — Tutunjian & Bitetto, P.C.; Vazken Alexanian (57) ABSTRACT

To identify a scenario that will bear a good simulation result from among a plurality of scenarios used in an agent-based simulation with a reduced amount of computation, there is provided an information processing apparatus comprising a counting part configured to count the number of agents in each of a plurality of states at a middle of a simulation that involves a plurality of agents, and a generation part configured to generate characteristic data used for prediction of a result of the simulation based on the number of agents in each of the plurality of states.

20 Claims, 8 Drawing Sheets

(56) References Cited

FOREIGN PATENT DOCUMENTS

| JP | 2005-215909 A2 | 8/2005 |
|---|---|---|
| JP | 2009-018623 A | 1/2009 |
| JP | 2011-186746 A | 9/2011 |
| JP | 2013-134155 A | 7/2013 |
| JP | 2014-115877 A | 6/2014 |

OTHER PUBLICATIONS

Balaji, P. G., X. German, and Dipti Srinivasan. "Urban traffic signal control using reinforcement learning agents." IET Intelligent Transport Systems 4.3 (2010): 177-188. (Year: 2010).*

De Oliveira, Lucas Barcelos, and Eduardo Camponogara. "Multi-agent model predictive control of signaling split in urban traffic networks." Transportation Research Part C: Emerging Technologies 18.1 (2010): 120-139. (Year: 2010).*

Doniec, Arnaud, et al. "Dealing with Multi-Agent Coordination by Anticipation: Application to the Traffic Simulation at Junctions." EUMAS 5 (2005): 478-479. (Year: 2005).*

Gomes, G., A. May, and R. Horowitz. 2004. ""Congested Freeway Microsimulation Model Using VISSIM"". Transportation Research Record: Journal of the Transportation Research Board No. 1876: pp. 71-81.

Beers, W. C. M. V., and J. P. C. Kleijnen. 2004. ""Kriging Interpolation in Simulation: A Survey"". In Proceedings of the 2004 Winter Simulation Conference, edited by R. G. Ingalls, M. D. Rossetti, J. S. Hara, Raymond, Morimura, and Muta Smith, and B. A. Peters, 113-121: Piscataway, New Jersey: Institute of Electrical and Electronics Engineers (IEEE), Inc.

\* cited by examiner

| | ENTER | EXIT | DWELL |
|---|---|---|---|
| ROAD A | 0 | 1 | 1 |
| ROAD B | 0 | 1 | 0 |
| ROAD C | 1 | 0 | 0 |
| ROAD D | 1 | 0 | 1 |

INFORMATION PROCESSING APPARATUS, PROGRAM AND INFORMATION PROCESSING METHOD

BACKGROUND

The present invention relates to an information processing apparatus, a program, and an information processing method.

Methods of simulating traffic states and agent-based traffic simulation methods that involve multiple agents are known. Identifying a scenario that will bear a good evaluation (a high key performance index (KPI), for example) from among a large number of simulated scenarios requires simulation of behaviors or the like of a large number of agents in all the scenarios, which requires a vast amount of computation.

There is also known a method of reducing the amount of computation by predicting simulation results from information included in the scenarios and omitting the scenarios predicted to be bad. However, this method fails to predict the simulation results with sufficient precision.

SUMMARY

There is a problem of identifying a scenario that will bear a good simulation result from among a plurality of scenarios used in an agent-based simulation with a reduced amount of computation.

According to a first aspect of the present invention, there are provided an information processing apparatus comprising a counting part configured to count the number of agents in each of a plurality of states at a midpoint of a simulation that involves a plurality of agents, and a generation part configured to generate characteristic data used for prediction of a result of the simulation based on the number of agents in each of the plurality of states, a program used for the information processing apparatus, and a method used in the information processing apparatus.

The summary of the present invention described above does not list all the features of the present invention. Furthermore, sub-combinations of these features are also included in the present invention.

DETAILED DESCRIPTION

In the following, an embodiment of the present invention will be described. However, the embodiment described below is not intended to limit the present invention defined by the claims. All the combinations of features described with regard to the embodiment are not always essential for the solution to the problems according to the present invention.

Figure 1:
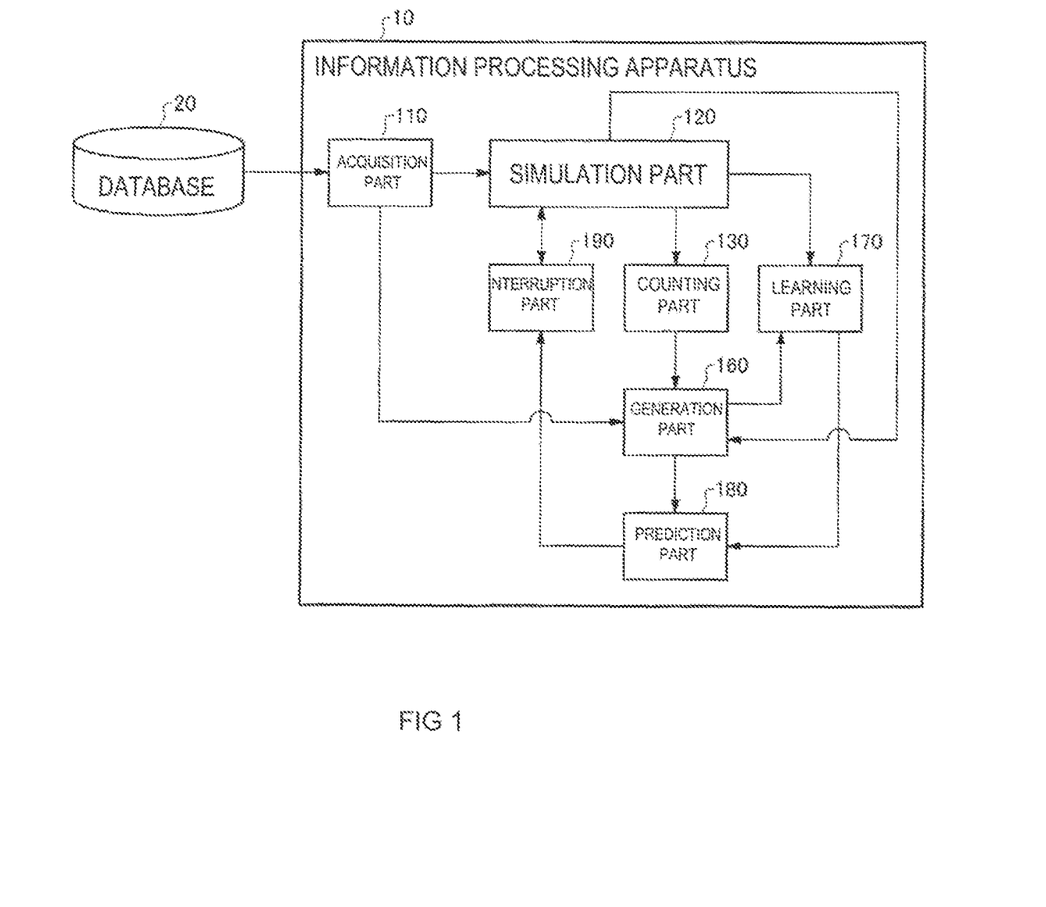
FIG. 1 is a block diagram showing an information processing apparatus according to an embodiment.

FIG. 1 is a block diagram showing an information processing apparatus 10 according to one embodiment. The information processing apparatus 10 performs an agent-based simulation of a scenario that is to be simulated. The information processing apparatus 10 performs simulations of some of a plurality of scenarios and learns a prediction model that predicts whether the simulation results are good or bad from states of agents in the middle of the simulations.

The information processing apparatus 10 predicts evaluations of simulations of the rest of the scenarios from the states of the agents in the middle of the simulations based on the learned prediction model and completes only the simulations of the scenarios the predicted evaluations of which are good. The information processing apparatus 10 comprises an acquisition part 110, a simulation part 120, a counting part 130, a generation part 160, a learning part 170, a prediction part 180, and an interruption part 190.

The acquisition part 110 acquires a simulation condition for each of the plurality of scenarios from a database 20 that is external or internal to the information processing apparatus 10. For example, the acquisition part 110 acquires a simulation condition for a learning scenario in learning, and acquires a simulation condition for a prediction-target scenario in prediction. The acquisition part 110 supplies the plurality of simulation conditions acquired to the simulation part 120 and the generation part 160.

The simulation part 120 performs an agent-based simulation that involves a plurality of agents under each of the plurality of simulation conditions. For example, the simulation part 120 performs a simulation that involves as agents a plurality of vehicles running in a city under each simulation condition, and calculates an attribute, such as a current position, of each agent at different points in time. In addition, the simulation part 120 can calculate the evaluation of the simulation of each scenario at each point in time, such as the maximum length of a traffic jam.

The simulation part 120 supplies, to the counting part 130, the attribute of each agent at a midpoint of the simulation that precedes an end point set for the simulation. The simulation part 120 may supply the evaluation of the simulation, such as KPI, at the midpoint of the simulation to the generation part 160.

In addition, in learning, the simulation part 120 supplies the simulation results for a plurality of scenarios to the learning part 170. For example, the simulation part 120 supplies the evaluations of the simulations at the end point thereof to the learning part 170. In prediction, the simulation part 120 can supply the evaluations of the simulations of a plurality of scenarios at the end point thereof to the interruption part 190.

The counting part 130 counts the number of agents in each of a plurality of states at the midpoint of a simulation based on the attributes of the agents. For example, the counting part 130 sorts the plurality of agents into a plurality of predefined states according to a position of a vehicle which is an agent and counts, for each scenario, the number of agents sorted into each state. The counting part 130 provides the count result to the generation part 160.

Based on the number of agents in each of the plurality of states counted by the counting part 130, the generation part 160 generates characteristic data used for prediction of the simulation results. For example, the generation part 160 generates, for each scenario, characteristic data including a vector or matrix the elements of which are the numbers of agents in the states at the midpoint of the simulation.

Furthermore, the generation part 160 may generate characteristic data including the evaluation and/or simulation condition at the midpoint of the simulation. The generation part 160 supplies the generated characteristic data to the learning part 170 in learning, and supplies the generated characteristic data to the prediction part 180 in prediction.

Based on the plurality of pieces of characteristic data generated at the midpoint of the simulations using the respective simulation conditions and the plurality of corresponding simulation results, the learning part 170 allows the prediction part 180 to learn. For example, the learning part 170 learns the correspondence between the characteristic data and the simulation results for a plurality of scenarios, and learns a prediction model that predicts the simulation results from the characteristic data at the midpoint of the simulations. The learning part 170 provides the prediction model to the prediction part 180.

Based on the characteristic data at the midpoint of the simulations, the prediction part 180 predicts whether the simulation results are good or bad using the prediction model. For example, for each scenario, the prediction part 180 inputs the characteristic data to the prediction model to calculate a prediction value of the evaluation at the end point of the simulation, and predicts whether the simulation result is good or bad based on the calculated prediction value. The prediction part 180 supplies the prediction result to the interruption part 190.

In response to a prediction that a simulation result is bad, the interruption part 190 interrupts the simulation. For example, if the evaluation predicted based on the characteristic data or the like at the midpoint of the simulation of a scenario is not good, the interruption part 190 makes the simulation part 120 interrupt the simulation of the scenario. In response to the simulation being interrupted, the interruption part 190 makes the simulation part 120 start a simulation under a different simulation condition.

As described above, the information processing apparatus 10 learns a prediction model that predicts an evaluation of a simulation at the end point of the simulation based on the number of agents in each of different states at a midpoint of the simulation. Although the number of agents in each state indicates an overall situation of the agents at the midpoint of the simulation as with the attributes of the agents, the number of agents is represented by a substantially smaller amount of data than the attributes of the agents. Therefore, the information processing apparatus 10 can predict the simulation result with a reduced amount of computational resources.

Furthermore, since the information processing apparatus 10 completes only the simulations of the scenarios that are likely to bear a good result based on the prediction result, the information processing apparatus 10 can more efficiently identify a scenario that will bear a good result from among a plurality of scenarios.

Figure 2:
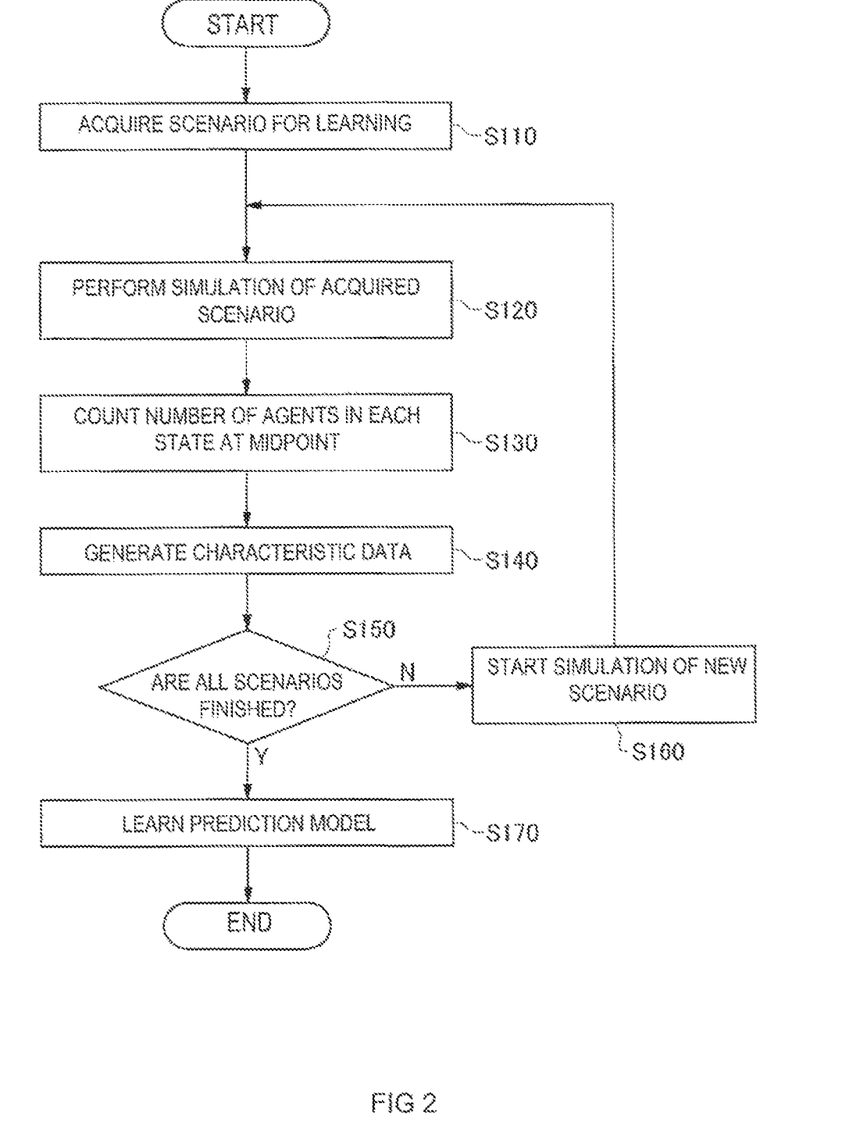
FIG. 2 shows a flow of a learning process performed by the information processing apparatus according to the embodiment.

FIG. 2 shows a flow of a learning process performed by the information processing apparatus 10 according to one embodiment. In this embodiment, the information processing apparatus 10 performs processings of S110 to S170 to learn a prediction model that predicts an evaluation of a simulation. Although the following description will be made in the context of a specific example in which the information processing apparatus 10 regards a plurality of vehicles running in a city as agents and evaluates the lengths of traffic jams or the like caused by a traffic control, targets of the processing by the information processing apparatus 10 are not limited to such vehicles, and the information processing apparatus 10 can simulate the behavior of any other targets (such as human beings, animals or plants, microorganisms, robots, or particulates).

First, in S110, the acquisition part 110 acquires simulation conditions for a plurality of learning scenarios from the database 20 or the like that is external or internal to the information processing apparatus 10. For example, for N scenarios of a total of N+M scenarios used for learning, the acquisition part 110 acquires traffic control conditions imposed on a plurality of predefined roads in the city as simulation conditions.

For example, for a traffic control imposed on R roads in a traffic control simulation target area, the acquisition part 110 acquires a simulation condition $\theta=(\theta_1^T, \theta_2^T)^T \in \{0, 1\}^{4R}$. Then, $\theta_i \in \{0, 1\}^4$ (i=1, 2, ..., R). With the vector $\theta_i$ for the condition imposed on an i-th road, if the first element $\theta_{i1}$ is 1, it means that "no traffic control is imposed on the road i". If the second element $\theta_{i2}$ is 1, it means that "the road i is a one-way road (traffic is prohibited in one direction, and the traffic is doubled in the opposite direction)". If the third element $\theta_{i3}$ is 1, it means that "the road i is a reverse one-way road (the traffic is doubled in the one direction, and traffic is prohibited in the opposite direction)". If the fourth element $\theta_{i4}$ is 1, it means that "the road i is closed (traffic is prohibited in both the directions).

In this case, the simulation condition θ is a 4R-dimensional binary vector. For example, if a control that "the road i is a reverse one-way road" is imposed on the road i, the condition for the road i is $\theta_i = \{0, 0, 1, 0\}$.

The acquisition part 110 may acquire a simulation condition including initial states or the like of the plurality of agents. The acquisition part 110 provides the plurality of acquired simulation conditions to the simulation part 120 and the generation part 160.

In S120, the simulation part 120 then performs and completes an agent-based simulation involving the plurality of agents under a target one of the plurality of simulation conditions. For example, the simulation part 120 performs a traffic control simulation regarding a plurality of vehicles running in a city as agents under a traffic control corresponding to the target simulation condition.

The simulation part 120 acquires attributes of the plurality of agents, including the states and movements of the agents, at a midpoint of the simulation. For example, the simulation part 120 acquires, as attributes, the current positions, the destinations and the like of the agents at the midpoint of the traffic control simulation.

The simulation part 120 can acquire the attributes of the agents at one or more midpoints of the simulation. For example, when the simulation part 120 simulates the behaviors of the agents in a period of 60 minutes, the simulation part 120 may acquire attributes of the agents at 30 minutes after the start of the simulation, which is a midpoint of the simulation.

Alternatively, when the duration of the simulation is 60 minutes, the simulation part 120 may acquire attributes of the agents at 10 minutes, 20 minutes and 30 minutes after the start of the simulation. The simulation part 120 supplies the attributes of the agents at the midpoints to the counting part 130.

Furthermore, the simulation part 120 can calculate an evaluation of the simulation at the end point of the simulation, or at a midpoint and the end point of the simulation. The midpoint at which the simulation part 120 calculates the evaluation of the simulation can be the same as the point in time at which the simulation part 120 acquires the attributes of the agents. For example, the simulation part 120 may calculate the length of a traffic jam at one point in time or a plurality of points in time in the course of the traffic control simulation as a midpoint. The simulation part 120 can calculate a plurality of kinds of evaluations at each point in time. For example, as the plurality of kinds of evaluations, the simulation part 120 can calculate the length of a traffic jam in a center area of the city and the length of a traffic jam in a suburb of the city.

For example, when the duration of the simulation is 60 minutes, the simulation part 120 may acquire the evaluations of the simulation $\xi_{10\ min}$, $\xi_{20\ min}$, $\xi_{30\ min}$, and $\xi_{60\ min}$ at 10 minutes (midpoint), 20 minutes (midpoint), and 30 minutes (midpoint), and 60 minutes (end point) after the start of the simulation, respectively, and generate an evaluation in the middle of the simulation $\xi_{KPI} = \{\xi_{10\ min}, \xi_{20\ min}, \xi_{30\ min}\}$.

The simulation part 120 supplies the evaluation at the end point of the simulation to the learning part 170. In addition, the simulation part 120 can supply the evaluation of the simulation in the midpoint of the simulation $\xi_{KPI}$ to the generation part 160.

In S130, the counting part 130 then counts the number of agents in each of the plurality of states in the middle of the simulation. For example, the counting part 130 first allocates each of the plurality of agents to one of the states predefined based on the attribute of the agent at each of the points in time at which the attribute of the agent is acquired. The counting part 130 then counts the number of agents in each of the plurality of the states.

For example, the counting part 130 may count the number of agents (number of vehicles) in a state of "entering the road i" at a midpoint q ($q \in Q|Q$ represents an integer equal to or greater than 1) during the simulation. Alternatively, the counting part 130 may count the number of agents in a state of "exiting from the road i" at the midpoint q. Alternatively, the counting part 130 may count the number of agents in a state of "dwelling on the road i" at the midpoint q. The counting part 130 provides the count result to the generation part 160.

In S140, based on the number of agents in each of the plurality of states counted by the counting part 130, the generation part 160 then generates characteristic data used for prediction of the simulation result. For example, the generation part 160 generates characteristic data based on the number of agents in each of the plurality of states at one or more points in time.

For example, the generation part 160 may generate an R×Q matrix $\xi_{In}$ containing, as an element $\xi_{In,\ i,\ q}$, the number of agents in the state of "entering the road i ($i \in R$) at the midpoint q ($1 \in Q|Q$ represents an integer equal to or greater than 1), generate an R×Q matrix $\xi_{Out}$ containing, as an element $\xi_{Out,\ i,\ q}$, the number of agents (number of vehicles) in the state of "exiting from the road i" at the midpoint q, generates an R×Q matrix $\xi_{Stay}$ containing, as an element $\xi_{Stay,\ i,\ q}$, the number of agents (number of vehicles) in the state of "dwelling on the road i" at the midpoint q, and generate characteristic data $x = \{\xi_{In}, \xi_{Out}, \xi_{Stay}\}$.

The generation part 160 may generate characteristic data x further including the evaluation of the simulation at the midpoint thereof and/or the simulation condition. For example, based on the simulation condition θ and the evaluation $\xi_{KPI}$ of the simulation at the midpoint thereof, the generation part 160 may generate characteristic data $z = \{\theta, \xi_{KPI}, \xi_{In}, \xi_{Out}, \xi_{Stay}\}$. The generation part 160 supplies the generated characteristic data x to the learning part 170.

In S150, the simulation part 120 then determines whether the simulations of all the scenarios used for learning are finished or not. If it is determined that the simulations of all the scenarios used for learning are finished, the simulation part 120 proceeds the process to S170. Otherwise, the simulation part 120 proceeds the process to S160.

In S160, the simulation part 120 starts processing a new scenario that has not been simulated yet of the scenarios used for learning. The simulation part 120 starts the processing of the new scenario from S120.

In S170, the learning part 170 learns a prediction model that predicts the simulation result from the characteristic data of each scenario, using the result of the simulations of the plurality of learning scenarios. For example, the learning part 170 may learn a prediction model by kernel ridge regression.

For example, the learning part 170 generates a prediction model that predicts an evaluation $\hat{g}_p(x)$ of the simulation from the characteristic data x according to the following formula 1. In formula 1, p denotes the kind of the evaluation in the prediction model. That is, the learning part 170 can generate a prediction model for each of P evaluations, where $p \in P$.

$$\hat{g}_p(x) = \sum_{l=1}^{L} \sum_{j=1}^{J} \alpha_{lj} k(x_j, u_j^{(l)}) + \beta \qquad \text{formula 1}$$

In formula 1, J denotes the number of kinds of characteristics of the characteristic data (for example, if the characteristic data $x = \{\theta, \xi_{KPI}, \xi_{In}, \xi_{Out}, \xi_{Stay}\}$, J=5, and $x_1 = \theta$, $x_2 = \xi_{KPI}$, $x_3 = \xi_{In}$, $x_4 = \xi_{Out}$, and $x_5 = \xi_{Stay}$), L denotes the number of kernel functions, and $\alpha_{lj}$ and β denote real number parameters. k(•) denotes a Gaussian kernel function. For example, ks(w, w') = exp($-\|w - w'\|^2 / 2\sigma^2$). σ denotes a Gaussian kernel width parameter. $u_j^{(l)}$ represents the first kernel center corresponding to $x_j$. For example, $u_j^{(l)}$ is training data, and is set to $x_j^{(l)}$. In this case, N=L.

Based on optimization of the following formula 2, the learning part 170 learns a prediction model that predicts the evaluation $\hat{g}_p(x)$ of the simulation at the end point thereof.

$$\min_{A, \beta} \frac{1}{2N} \sum_{n=1}^{N} (y_p^{(n)} - \hat{g}_p(x^{(n)}))^2 + \frac{\rho}{2} \|A\|_F^2 \qquad \text{formula 2}$$

In formula 2, $y_p^{(n)}$ denotes the evaluation of the simulation of an n-th scenario ($n \in N$) at the end point, $x^{(n)}$ denotes the characteristic data for the n-th scenario, A represents a matrix containing an element that satisfies $A_{lj} = \alpha_{lj}$, $\|\cdot\|_F$ represents a Frobenius norm of the matrix, and ρ denotes a non-negative regularization parameter. That is, the learning part 170 learns the matrix A and β that minimize the sum of the total sum of the differences between the final evaluation $y_p$ and the predicted evaluation $\hat{g}_p(x)$ of all the scenarios for learning and the penalty term represented by $\|A\|_F^2$.

The learning part 170 can analytically calculate the matrix A and β according to the following formulas 3 and 4.

$$vec(A) = (G^T H_N G + N\rho I_{LJ})^{-1} G^T H_N Y_p = G^T H_N (H_N G - G^T H_N + N\rho I_N)^{-1} Y_p \quad \text{formula 3}$$

$$\beta = 1_N^T (Y_p - G_{vec}(A))/N \quad \text{formula 4}$$

In formulas 3 and 4, $Y_p$ represents $(y_p^{(1)}, y_p^{(2)}, \ldots y_p^{(N)})^T$, G represents $(vec(K(x^{(1)})), vec(K(x^{(2)})), \ldots vec(K(x^{(N)})))$, $vec(\cdot)$ represents a vectorization operator, $I_N$ represents an N-dimensional vector all the elements of which are 1, $I_N$ represents a N×N unit matrix, $I_{LJ}$ represents an LJ×LJ unit matrix, $H_N$ represents $IN - 1_N 1_N^T / N$. The regularization parameter and the width parameter σ may be previously set by a user or determined in a model selection method, such as cross-validation.

The learning part 170 provides the learned prediction model to the prediction part 180. For example, the learning part 170 supplies the matrix A, β and the like learned according to the formulas 1 to 4 to the prediction part 180.

As described above, using the result of simulations of a plurality of scenarios for learning, the information processing apparatus 10 learns a prediction model $\hat{g}_p(x)$ that predicts the evaluations $y_p$ of the simulations at the end point thereof based on the numbers of agents in different states in the middle of the simulations.

Figure 3:
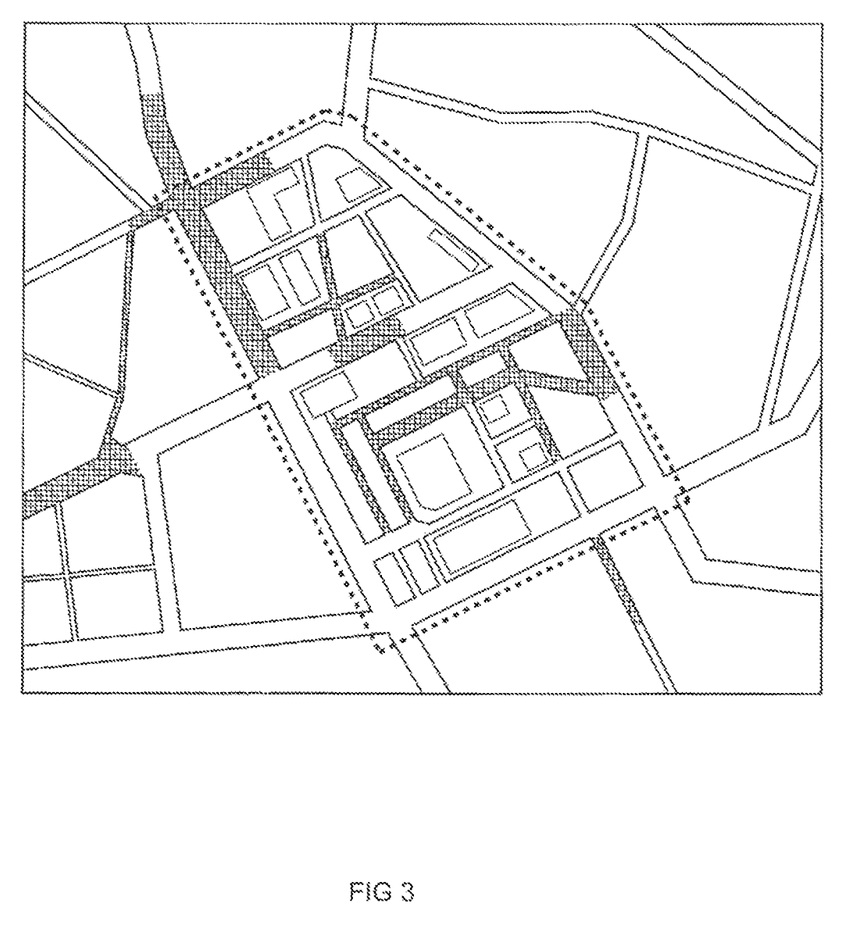
FIG. 3 is a diagram for illustrating an example of a traffic control simulation to be processed by the information processing apparatus.

FIG. 3 shows an example of the traffic control simulation to be processed by the information processing apparatus 10. For example, the simulation part 120 simulates a traffic situation of a city under a plurality of scenarios that each prescribes a simulation condition as shown in FIG. 3. For example, as the evaluation (KPI) of the simulation at the end point thereof, the simulation part 120 can calculate the total sum of the lengths of traffic jams that occur in a center area (the area inside the dotted line in the drawing) of the city at 60 minutes after the start of the simulation or the total sum of the lengths of traffic jams that occur in a suburb (the area outside the dotted line in the drawing) of the city.

Figure 4:
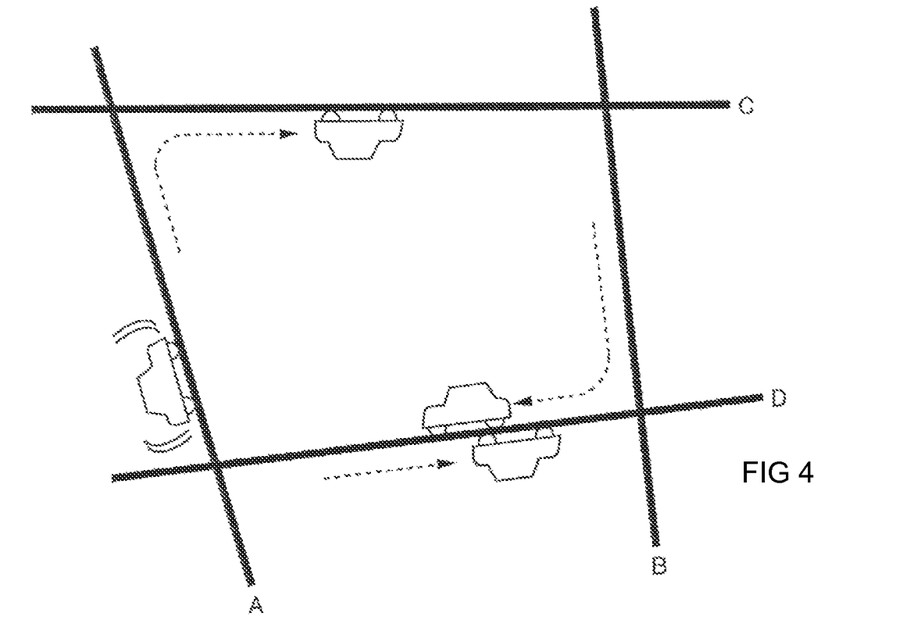
FIG. 4 is a diagram showing an example of a situation of agents in the traffic control simulation.

FIG. 4 shows an example of a situation of the agents at the midpoint q during the traffic control simulation. The simulation part 120 simulates the attributes and movements of a plurality of agents, which are four vehicles on roads A to D in this example. As shown in the drawing, one vehicle is not moving on the road A, another vehicle is moving from the road A to the road C, another vehicle is moving from the road B to the road D, and another vehicle is moving on the road D. The counting part 130 allocates these vehicles to a plurality of states based on the attributes of the four vehicles, such as the current positions, the departure points, the velocities, or the destinations.

Figure 5:
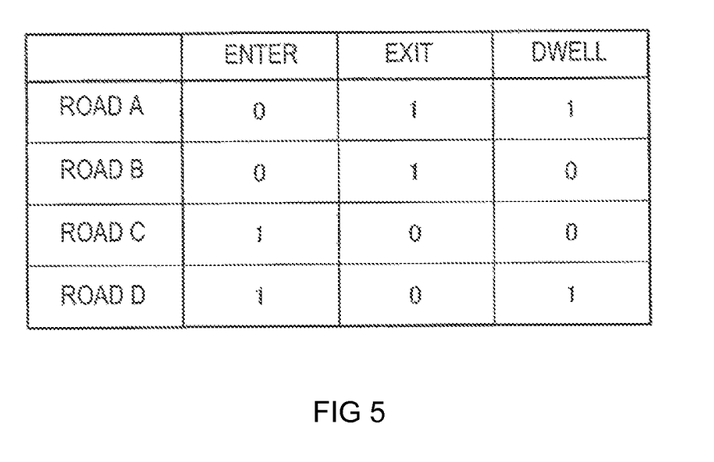
FIG. 5 is a table showing an example of the number of agents in different states in the situation shown in FIG. 4.

FIG. 5 shows an example of the numbers of agents in different states in the situation shown in FIG. 4. For example, from the situation shown in FIG. 4, the counting part 130 counts the number of agents in the state of "entering the road A" to be 0 ($\xi_{IN, A, q}=0$), the number of agents in the state of "entering the road B" to be 0 ($\xi_{IN, B, q}=0$), the number of agents in the state of "entering the road C" to be 1 ($\xi_{IN, C, q}=1$), and the number of agents in the state of "entering the road D" to be 1 ($\xi_{IN, D, q}=0$).

Furthermore, from the situation shown in FIG. 4, the counting part 130 counts the number of agents in the state of "exiting from the road A" to be 1 ($\xi_{Out, A, q}=1$), the number of agents in the state of "exiting from the road B" to be 1 ($\xi_{Out, B, q}=1$), the number of agents in the state of "exiting from the road C" to be 0 ($\xi_{Out, C, q}=0$), and the number of agents in the state of "exiting from the road D" to be 0 ($\xi_{Out, D, q}=0$).

Furthermore, from the situation shown in FIG. 4, the counting part 130 counts the number of agents in the state of "dwelling on the road A" to be 1 ($\xi_{Stay, A, q}=1$), the number of agents in the state of "dwelling on the road B" to be 0 ($\xi_{Stay, B, q}=0$), the number of agents in the state of "dwelling on the road C" to be 0 ($\xi_{Stay, C, q}=0$), and the number of agents in the state of "dwelling on the road D" to be 1 ($\xi_{Stay, D, q}=1$).

Figure 6:
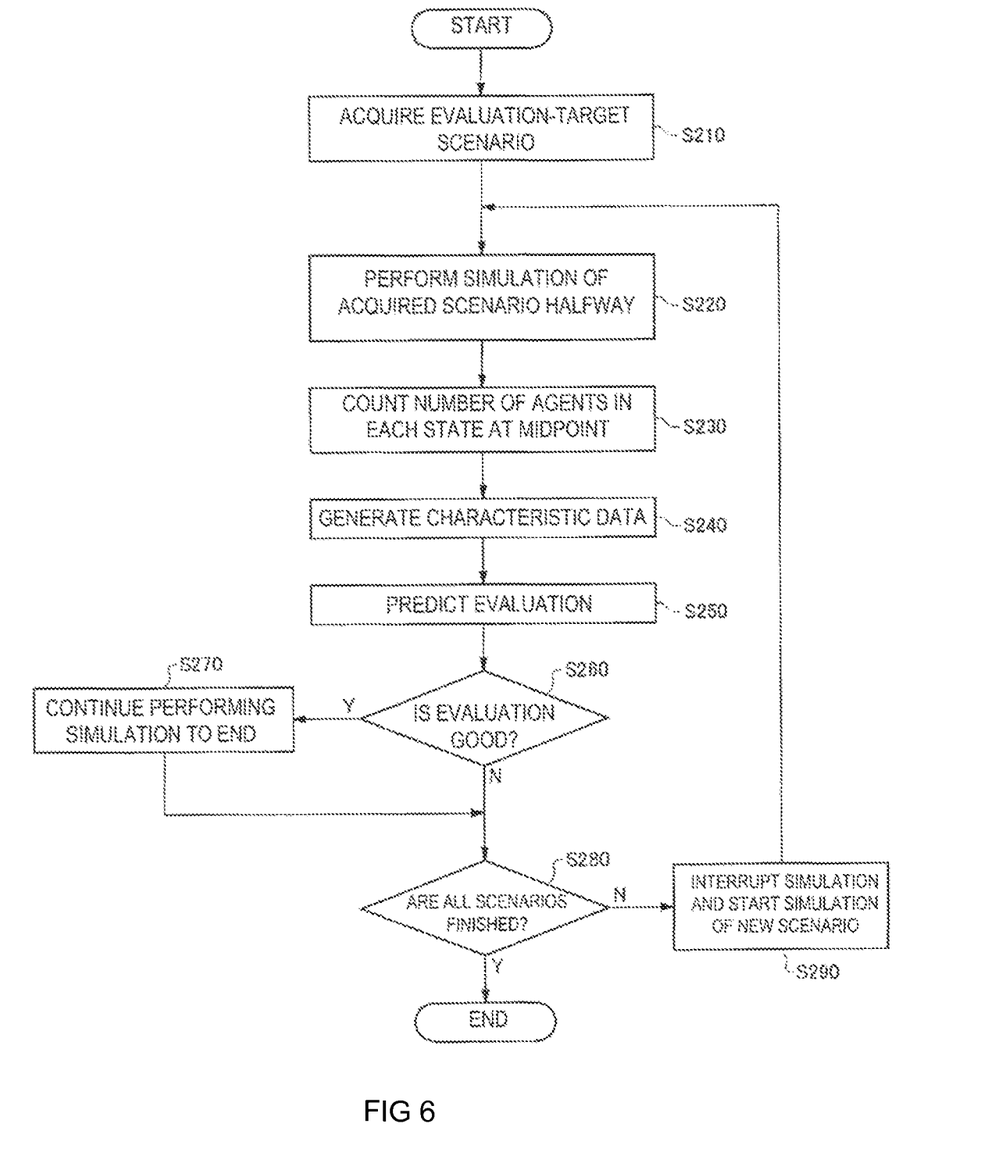
FIG. 6 shows a flow of a prediction process performed by the information processing apparatus according to the embodiment.

FIG. 6 shows a flow of a prediction process performed by the information processing apparatus 10 according to one embodiment. In this embodiment, the information processing apparatus 10 performs the processings of S210 to S290 to predict evaluations of simulations at the end point thereof under prediction target scenarios and completes only the simulations of part of the scenarios that bear a good prediction result.

First, in S210, the acquisition part 110 acquires simulation conditions for a plurality of prediction-target scenarios from the database 20 or the like that is external or internal to the information processing apparatus 10. For example, for M scenarios of a total of N+M scenarios that are not included in the N scenarios used for learning, the acquisition part 110 acquires traffic control conditions imposed on the plurality of predefined roads in the city as simulation conditions. The acquisition part 110 can perform the processing of S210 in the same manner as the processing of the learning scenarios in S110.

In S220, the simulation part 120 then performs a simulation under a target one of the plurality of simulation conditions of the prediction-target scenarios, as in S120. For example, the simulation part 120 performs the simulation up to a midpoint thereof, rather than completing the simulation. For example, the simulation part 120 performs the simulation up to the point in time at which the numbers of agents are counted in S130 (for example, 30 minutes after the start of the simulation in the case where the duration of the simulation is 60 minutes).

The simulation part 120 acquires attributes of the plurality of agents, including the states and movements of the agents, at the midpoint of the simulation. The simulation part 120 supplies the attributes of the agents at the midpoint to the counting part 130. As in S120, the simulation part 120 can calculate an evaluation of the simulation at one or more midpoints thereof and supplies the evaluation to the generation part 160.

In S230, the counting part 130 then counts the number of agents in each of the plurality of states in the middle of the simulation, as in S130. The counting part 130 provides the count result to the generation part 160.

In S240, based on the number of agents in each of the plurality of states counted by the counting part 130, the generation part 160 then generates characteristic data used for prediction of the simulation result. The generation part 160 can generate the characteristic data by performing the same processing as in S140. The generation part 160 provides the generated characteristic data to the prediction part 180.

In S250, using the prediction model, the prediction part 180 then predicts whether the simulation result is good or bad based on the characteristic data at the middle of the simulation. For example, the prediction part 180 can calculate a prediction value of an evaluation of the simulation at the end point thereof from the characteristic data based on the number of agents at one or more midpoints during the simulation.

For example, first, the prediction part 180 predicts the evaluation $\hat{g}_p(x)$ of the simulation (the length of a traffic jam, for example) at the end point thereof by performing a calculation of the formula 1 reflecting the learned matrix A and β by substituting the characteristic data x={θ, $\xi_{KPI}$, $\xi_{In}$, $\xi_{Out}$, $\xi_{Stay}$} into the formula 1. The prediction part 180 supplies the predicted evaluation value to the interruption part 190.

In S260, the interruption part 190 then determines whether to regard the evaluation predicted by the prediction part 180 as "good" or not. For example, the interruption part 190 can determine that the evaluation is good if the predicted evaluation is equal to or greater than a preset threshold (or smaller than the threshold), or determine that the evaluation is not good if the evaluation is smaller than the preset threshold (or equal to or greater than the threshold). For example, the interruption part 190 can determine that the evaluation is good if the predicted length of a traffic jam is smaller than a predetermined value.

If the determination result is "good", the interruption part 190 proceeds the process to S270 to make the simulation part 120 resume the simulation. If the determination result is not "good", the interruption part 190 can proceed the process to S280 to make the simulation part 120 interrupt the simulation, thereby interrupting the simulation of the scenario being performed.

Furthermore, for example, the interruption part 190 may change the threshold used as a reference for interrupting the simulation based on a predefined number of best evaluations of a plurality of evaluations obtained by the simulation part 120 completing simulations under plurality of simulation conditions. For example, as the threshold, the interruption part 190 may use the evaluation rated at a predetermined rank of the evaluations of the simulations already performed.

Furthermore, for example, the interruption part 190 may proceed the process to S280 with a probability that depends on the evaluation predicted by the prediction part 180, thereby probabilistically interrupting the simulation of the scenario being performed.

In S270, the simulation part 120 resumes the simulation from the midpoint and completes the simulation. In this way, the simulation part 120 completes only the simulations of the scenarios that are predicted by the prediction part 180 to bear a good simulation result. The simulation part 120 can supply the evaluations of the completed simulations to the interruption part 190, and then, the interruption part 190 can change the threshold based on the evaluations of the simulations at the end point thereof.

In S280, the interruption part 190 determines whether the simulations of the M prediction-target scenarios are finished or not. If the interruption part 190 determines that the simulations are finished, the interruption part 190 ends the process. Otherwise, the interruption part 190 proceeds the process to S290. If it is determined that the simulations are finished, the simulation part 120 can select a scenario that bears a good evaluation at the end point (for example, the evaluation of which ranks among a predetermined number of best evaluations, or is equal to or greater than a predetermined value) from among the N scenarios used for learning simulated as shown in FIG. 2 and the M prediction-target scenarios.

In S290, the interruption part 190 makes the simulation part 120 interrupt the simulation of the scenario being performed, rather than resuming the simulation from the midpoint. Upon interrupting the simulation, the simulation part 120 resumes a simulation of a new scenario yet to be simulated of the prediction-target scenarios. The simulation part 120 performs the processing of S220 on the new scenario.

As described above, using the prediction model produced by the learning part 170, the information processing apparatus 10 predicts an evaluation $y_p$ of a simulation at the end point thereof based on the characteristic data x that is based on the number of agents in each state at a middle of the simulation. In this way, when performing simulations of a plurality of scenarios, the information processing apparatus 10 can interrupt the simulation of a scenario the evaluation of which at the end point thereof is predicted to be bad at the midpoint of the simulation, thereby preventing the computational resources from being wasted in identifying a scenario that will bear a good simulation result.

The description of this drawing has been made in the context that the information processing apparatus 10 performs simulations of scenarios up to a midpoint thereof one by one, and then determines whether to interrupt or resume the simulation. Alternatively, the information processing apparatus 10 may perform simulations of all the prediction-target scenarios up to a middle thereof, and select a scenario(s) to be completed based on the evaluations for all the scenarios predicted at the end point thereof.

Figure 7:
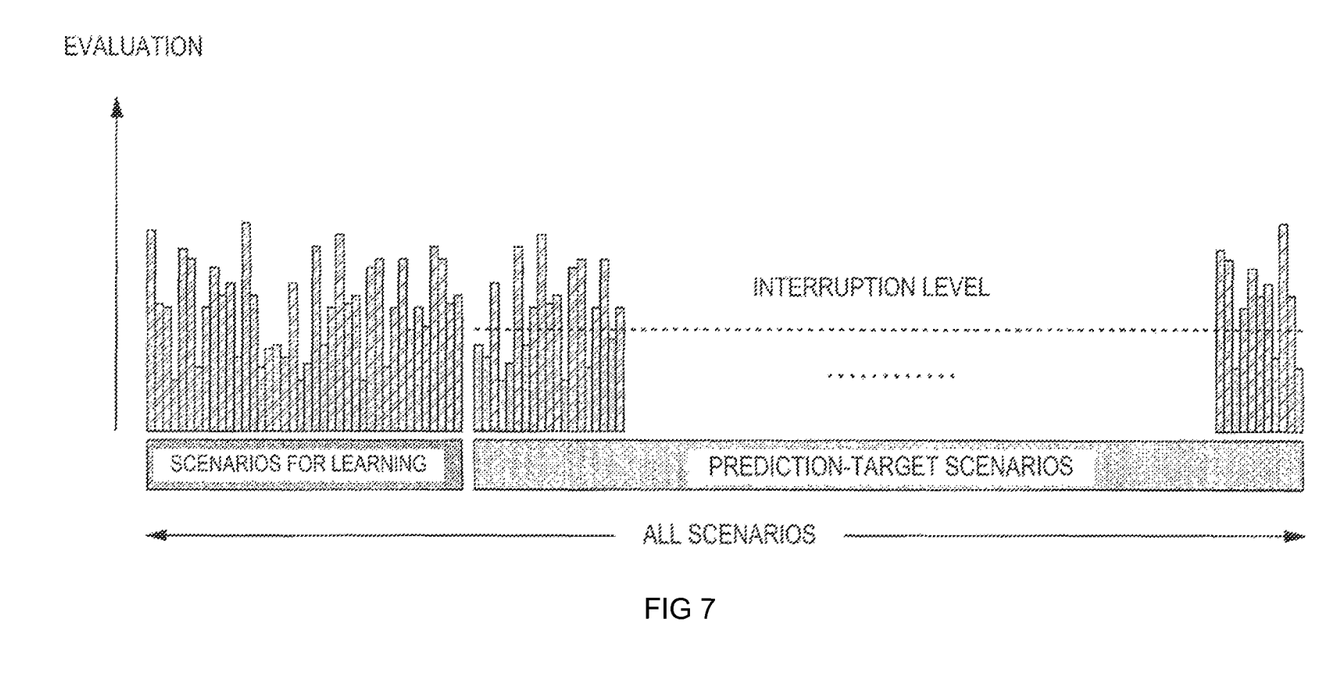
FIG. 7 is a diagram for illustrating an example of a learning and prediction process performed by the information processing apparatus.

FIG. 7 shows an example of a learning and prediction process performed by the information processing apparatus 10. The horizontal axis of the graph shown in this drawing indicates a plurality of scenarios, and the vertical axis indicates the evaluations of the simulations of the scenarios at the end point thereof. In this example, it is assumed that the information processing apparatus 10 is to identify all the scenarios that bear an evaluation equal to or greater than a predetermined level. As shown in the drawing, the information processing apparatus 10 processes the scenarios to be simulated by sorting the scenarios into scenarios used for learning and prediction-target scenarios.

For example, the information processing apparatus 10 first uses part of all the scenarios as scenarios for learning to perform the learning process shown in FIG. 2 to produce a prediction model. When the simulation part 120 performs simulations of the scenarios for learning, the information processing apparatus 10 obtains evaluations of the simulations of the scenarios at the end point thereof as in the form of the bar chart shown in FIG. 7, for example.

The information processing apparatus 10 then uses the rest of all the scenarios as prediction-target scenarios to perform the prediction process shown in FIG. 6 based on the prediction model. If the evaluation of a simulation predicted at a middle of the simulation (which corresponds to a bar shaded with dots in FIG. 7) is lower than an interruption level, the interruption part 190 of the information processing apparatus 10 interrupts the simulation, and the simulation part 120 starts a simulation of another scenario. In this way, the information processing apparatus 10 can quit halfway through the simulations of scenarios that are predicted to bear a bad result (scenarios shown by bars shaded with dots).

Figure 8:
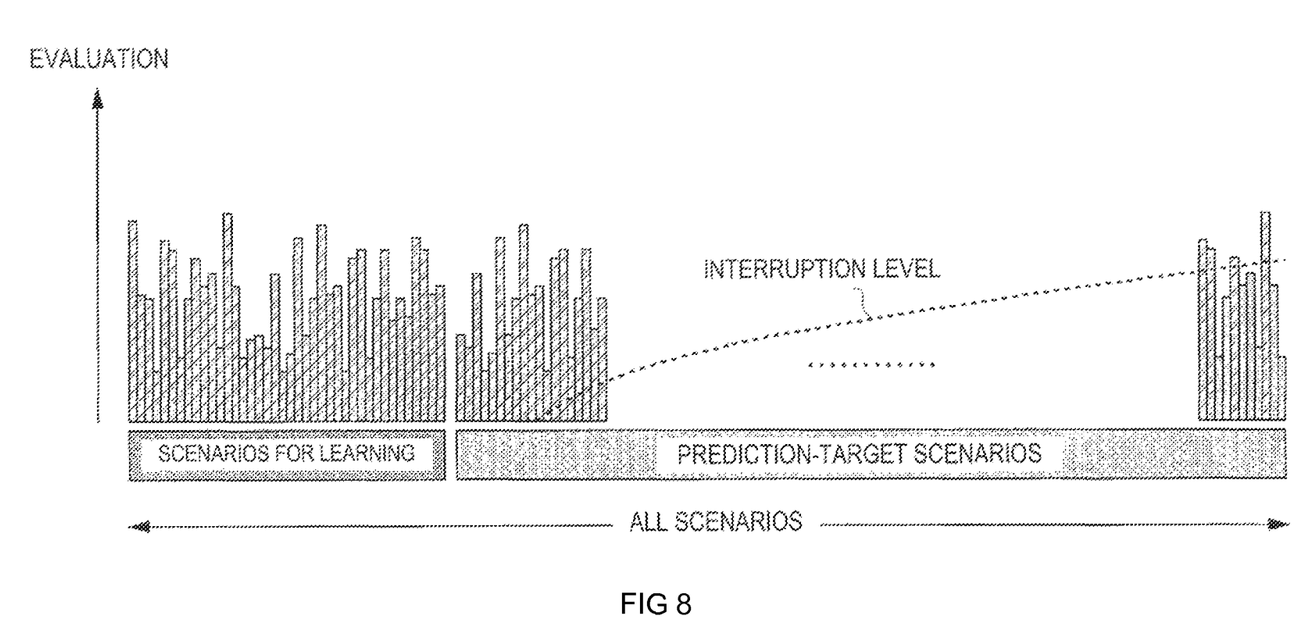
FIG. 8 is a diagram for illustrating another example of the learning and prediction process performed by the information processing apparatus.

FIG. 8 shows another example of the learning and prediction process performed by the information processing apparatus 10. The horizontal axis and the vertical axis of this drawing are the same as those shown in FIG. 7. In this example, the information processing apparatus 10 is to identify a predetermined number of scenarios that will bear a good simulation result (top 10 scenarios in terms of evaluation, for example) from among all the scenarios.

The information processing apparatus 10 performs simulations of scenarios for learning to produce a prediction model, as in the case shown in FIG. 7. If the information processing apparatus 10 determines that the evaluation of the simulation of a scenario at the end point thereof predicted at a middle thereof is not enough for the scenario to rank among top-ranked scenarios (top 10 scenarios, for example) that are to be selected, the information processing apparatus 10 interrupts the simulation. As processing of the prediction-target scenarios progresses, scenarios that will bear a good evaluation are accumulated, so that the level for scenarios to be included among the top-ranked scenarios rises.

Therefore, as simulations of the prediction-target scenarios progress, the interruption part 190 of the information processing apparatus 10 can change the threshold to interrupt a simulation to be more strict. For example, the interruption part 190 of the information processing apparatus 10 may adopt the evaluations of the top-ranked scenarios to be selected at the current point in time (for example, the evaluations of the top 10 scenarios at the current point in time) as the interruption level to interrupt a simulation.

Furthermore, to provide the interruption level with a margin, the interruption part 190 may adopt, as the interruption level to interrupt a simulation, the evaluation of a scenario that is a predetermined number (10, for example) of places lower than the top-ranked scenarios to be selected at the current point in time, or the evaluation that is a predetermined value lower than the evaluation of a top-ranked scenario, for example.

In this example, the interruption part 190 gradually changes the interruption level so as to rise as the processing of the prediction-target scenarios progresses as shown in FIG. 8. In this way, the interruption part 190 can substantially reduce simulations of useless scenarios as the processing of the scenarios progresses.

Figure 9:
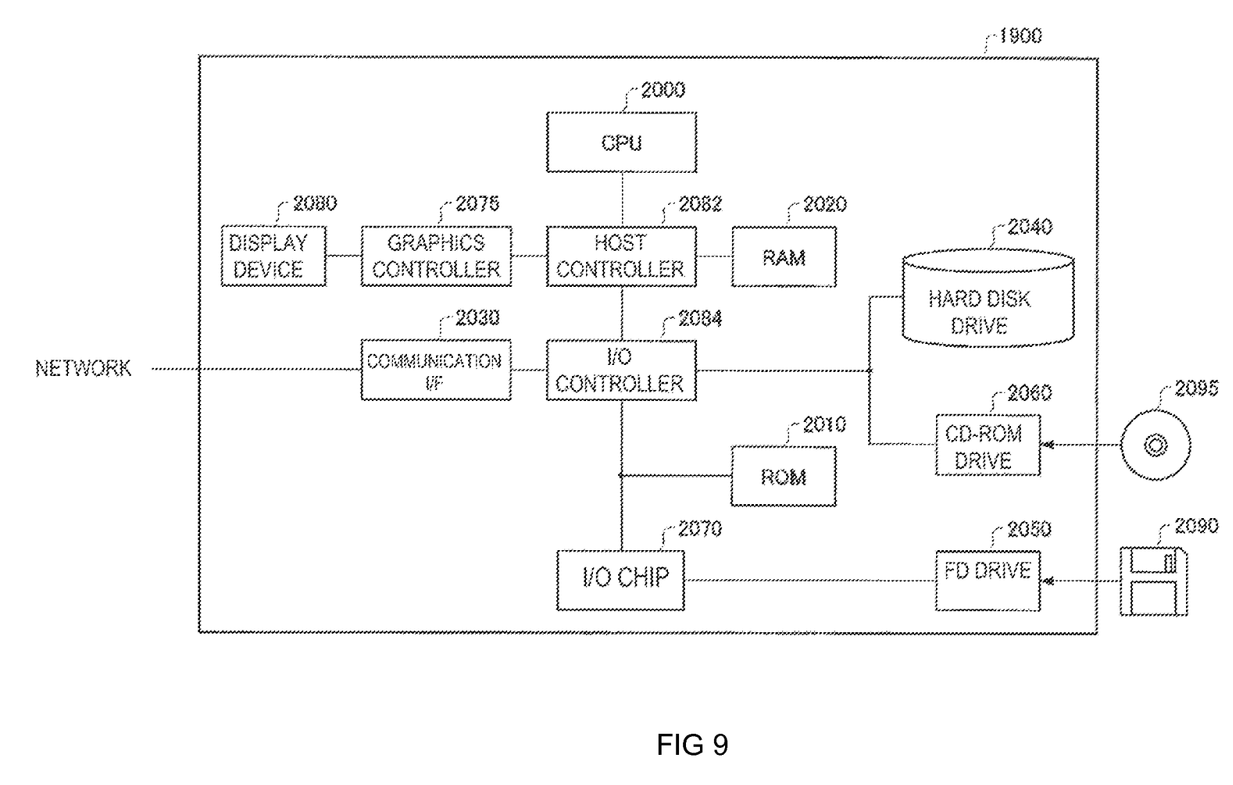
FIG. 9 shows an example of a hardware configuration of a computer.

FIG. 9 shows an example of a hardware configuration of a computer 1900 that functions as the information processing apparatus 10. The computer 1900 according to this embodiment comprises a CPU peripheral section including a CPU 2000, a RAM 2020, a graphics controller 2075, and a display device 2080 that are interconnected by a host controller 2082, an input/output section including a communication interface 2030, a hard disk drive 2040, and a CD-ROM drive 2060 that are connected by an input/output controller 2084 to the host controller 2082, and a legacy input/output section including a ROM 2010, a flexible disk drive 2050, and an input/output chip 2070 connected to the input/output controller 2084.

The host controller 2082 connects the RAM 2020 to the CPU 2000 and the graphics controller 2075 that access the RAM 2020 at high transfer rate. The CPU 2000 operates on a program stored in the ROM 2010 or the RAM 2020 to control each component. The graphics controller 2075 acquires image data generated by the CPU 2000 or the like in a frame buffer provided in the RAM 2020, and makes the display device 2080 display the image. Alternatively, the graphics controller 2075 may incorporate a frame buffer that stores image data generated by the CPU 2000 or the like.

The input/output controller 2084 connects the host controller 2082 to the communication interface 2030, which is a relatively high speed input/output device, the hard disk drive 2040, and the CD-ROM drive 2060. The communication interface 2030 communicates with another device via a wired or wireless network. The communication interface also functions as communication hardware. The hard disk drive 2040 stores a program and data used by the CPU 2000 in the computer 1900. The CD-ROM drive 2060 reads a program or data from a CD-ROM 2095, and provides the program or data to the hard disk drive 2040 via the RAM 2020.

To the input/output controller 2084, the ROM 2010, the flexible disk drive 2050, and the input/output chip 2070, which is a relatively low speed input/output device, are connected. The ROM 2010 stores a boot program executed to activate the computer 1900, and/or a program or the like that depends on the hardware of the computer 1900. The flexible disk drive 2050 reads a program or data from a flexible disk 2090, and provides the program or data to the hard disk drive 2040 via the RAM 2020. The input/output chip 2070 connects the flexible disk drive 2050 to the input/output controller 2084, and connects various input/output devices to the input/output controller 2084 via a parallel port, a serial port, a keyboard port, a mouse port or the like.

The program provided to the hard disk drive 2040 via the RAM 2020 is stored in a recording medium, such as the flexible disk 2090, the CD-ROM 2095 or an IC card, and provided by a user. The program is read from the recording medium, installed in the hard disk drive 2040 in the computer 1900 via the RAM 2020, and executed by the CPU 2000.

The program that is installed in the computer 1900 and causes the computer 1900 to function as the information processing apparatus 10 comprises an acquisition module, a simulation module, a counting module, a generation module, a learning module, a prediction module, and an interruption module. The program or modules can act on the CPU 2000 or the like to cause the computer 1900 to function as the acquisition part 110, the simulation part 120, the counting part 130, the generation part 150, the learning part 170, the prediction part 180, and the interruption part 190.

The information described in the program is loaded into the computer 1900 to cause the computer 1900 to function as the acquisition part 110, the simulation part 120, the counting part 130, the generation part 150, the learning part 170, the prediction part 180, and the interruption part 190, which are specific means that are combinations of software and the various hardware resources described above. These specific means achieve operations on or processings of information suitable for the use of the computer 1900 according to this embodiment, thereby building the specific information processing apparatus 10 suitable for the use.

For example, when the computer 1900 communicates with an external device or the like, the CPU 2000 executes a communication program loaded into the RAM 2020, and instructs the communication interface 2030 to perform communication processing based on a specific processing described in the communication program. Under the control of the CPU 2000, the communication interface 2030 reads transmission data stored in a transmission buffer region provided in a storage device, such as the RAM 2020, the hard disk drive 2040, the flexible disk 2090 or the CD-ROM 2095, and transmits the data to the network, or receives data from the network and writes the data into a reception buffer region or the like provided in the storage device. In this way, the communication interface 2030 can transfer transmission/reception data to the storage device and receive transmission/reception data from the storage device by direct memory access (DMA). Alternatively, the transmission/reception data may be transferred by the CPU 2000 reading data from the storage device or the communication interface 2030, which is the source, and writing the data to the communication interface 2030 or the storage device, which is the destination.

The CPU 2000 loads the whole or a required part of the files, database or the like stored in an external storage device, such as the hard disk drive 2040, the CD-ROM drive 2060 (CD-ROM 2095), or the flexible disk drive 2050 (flexible disk 2090), into the RAM 2020 by DMA transfer or the like, and performs various processings on the data in the RAM 2020. The CPU 2000 then writes the processed data back into the external storage device by DMA transfer or the like. In such a process, the RAM 2020 can be regarded as what temporarily holds the contents of the external storage device. Therefore, in this embodiment, the RAM 2020 and the external storage device or the like are collectively referred to as a memory, a storage part, a storage device or the like.

For example, as required, the storage part of the information processing apparatus 10 can store data received from, or to be provided to, the acquisition part 110, the simulation part 120, the counting part 130, the generation part 150, the learning part 170, the prediction part 180, and the interruption part 190. For example, the storage part can receive and store data input from the acquisition part 110. Furthermore, the storage part can store the result of learning by the learning part 170 or the like.

In the description of this embodiment, a description to the effect that information (a plurality of simulation conditions, for example) is supplied from one component (the acquisition part 110, for example) to another component (the simulation part 120, for example) can mean not only directly passing information from one component to another component but also passing information from one component to another component via storing the information in the storage part and reading the information from the storage part.

The various kinds of information, such as various kinds of programs, data, tables and databases, according to this embodiment are stored in the storage device and processed. The CPU 2000 can retain a part of the RAM 2020 in a cache memory and perform reading and writing on the cache memory. In such an implementation, the cache memory is responsible for a part of the function of the RAM 2020, so that the cache memory is included among the RAM 2020, the memory, and/or the storage device unless otherwise specified.

Furthermore, the CPU 2000 performs various processings specified by an instruction sequence of the program including various operations, manipulations of information, conditional determinations, and information searches and replacements described in the embodiment, on the data read from the RAM 2020, and writes the results back into the RAM 2020. For example, to make a conditional determination, the CPU 2000 determines whether or not various variables shown in the embodiment satisfy a condition that the variable is greater than, smaller than, equal to or greater than, equal to or smaller than, or equal to another variable or constant, and branches to a different instruction sequence or invoke a subroutine if the condition is satisfied (or not satisfied).

Furthermore, the CPU 2000 can retrieve information stored in a file or database in the storage device. For example, when a plurality of entries having an attribute value of a first attribute and an attribute value of a second attribute that are associated with each other are stored in the storage device, the CPU 2000 can retrieve an entry of which attribute value of the first attribute of which matches with a specified condition from among the plurality of entries stored in the storage device, and read the attribute value of the second attribute stored in the entry, thereby acquiring the attribute value of the second attribute associated with the first attribute having a value that satisfies the predetermined condition.

Although the embodiment of the present invention has been described, the technical scope of the present invention is not limited to the scope of the embodiment described above. It is obvious to those skilled in the art that various modifications and alteration can be made to the embodiment described above. It is obvious from the description of the claims that such modifications and alterations are also included in the technical scope of the present invention.

Note that the processings, such as operations, procedures, steps and stages, in the apparatus, the system, the programs and the methods described in the claims, the specification and the drawings can be performed in any order unless a particular order is explicitly specified by expressions such as "before" or "in advance" or the result of a processing is used in a subsequent processing. Even words "first", "then" and the like that are used, for the purpose of convenience, in the description of the flows of operations in the claims, the specification and the drawings do not mean that the order implied by those words is essential.

Although the embodiment of the present invention has been described, the technical scope of the present invention is not limited to the scope of the embodiment described above. It is obvious to those skilled in the art that various modifications and alteration can be made to the embodiment described above. It is obvious from the description of the claims that such modifications and alterations are also included in the technical scope of the present invention. For example, if an invention comprising an element A, an element B and an element C is described as an embodiment in the specification, the invention is intended to comprise only the element A, only the element B, only the element C, only the elements A and B, only the elements A and C, or only the elements B and C unless otherwise described.

Note that the processings, such as operations, procedures, steps and stages, in the apparatus, the system, the programs and the methods described in the claims, the specification and the drawings can be performed in any order unless a particular order is explicitly specified by expressions such as "before" or "in advance" or the result of a processing is used in a subsequent processing. Even words "first", "then" and the like that are used, for the purpose of convenience, in the description of the flows of operations in the claims, the specification and the drawings do not mean that the order implied by those words is essential.

What is claimed:

1. An information processing apparatus, comprising:
   a processor; and
   a computer readable storage medium storing instructions which, when executed by the processor, cause the processor to perform operations comprising:
   performing a first simulation that involves a plurality of agents under a first simulation condition;
   sorting the plurality of agents into a plurality of predefined states, wherein the plurality of predefined states comprises a plurality of different states;
   counting a number of the plurality of agents that is sorted into each state of the plurality of predefined states at a midpoint of the first simulation, wherein the number of the plurality of agents that is sorted into each state of the plurality of states is represented by a smaller amount of data than states of the plurality of agents; and
   generating characteristic data, wherein the characteristic data comprises the first simulation condition at the midpoint and a plurality of matrices, wherein each matrix of the plurality of matrices corresponds to one state of the plurality of predefined states, wherein elements of the each matrix comprise the number of the plurality of agents that is sorted into the one state of the plurality of predefined states; and predicting and outputting a result at an end point of the first simulation at the midpoint of the first simulation based on the characteristic data and the number of the plurality of agents that is sorted into the one state at the midpoint of the first simulation.

2. The information processing apparatus according to claim 1, wherein the operations further comprise:

calculating a value based on the characteristic data; and
predicting that the result of the first simulation is good when the value is at least equal to a preset threshold and that the result of the first simulation is bad when the value is less than the preset threshold.

3. The information processing apparatus according to claim 2, wherein the operations further comprise:

allowing the predicting to learn from a plurality of pieces of the characteristic data and a plurality of simulation results corresponding to the plurality of pieces of characteristic data.

4. The information processing apparatus according to claim 3, wherein the operations further comprise:

interrupting the first simulation in response to a prediction that the result of the first simulation is bad.

5. The information processing apparatus according to claim 4, wherein the interrupting changes a level for interruption of the first simulation based on a predefined number of top-ranked values selected from a plurality of values obtained by completing a plurality of simulations under a plurality of simulation conditions.

6. The information processing apparatus according to claim 4, wherein the first simulation is interrupted with a probability, wherein the probability depends on the value.

7. The information processing apparatus according to claim 4, wherein, in response to an interruption of the first simulation, a second simulation is started under a second simulation condition that is different from the first simulation condition.

8. The information processing apparatus according to claim 7, wherein the calculating calculates the value at an end point of the first simulation.

9. The information processing apparatus according to claim 8, wherein the generating generates the characteristic data at a plurality of points in time during the first simulation, and the calculating calculates the value at the end point of the first simulation from the characteristic data generated at the plurality of points in time.

10. The information processing apparatus according to claim 9, wherein the generating further generates the characteristic data based on the value.

11. An information processing method executed by a computer, comprising:

a simulation stage of performing a first simulation that involves a plurality of agents under a first simulation condition;

a counting stage of sorting the plurality of agents into a plurality of predefined states, wherein the plurality of predefined states comprises a plurality of different states, and of counting a number of the plurality of agents that is sorted into each state of the plurality of predefined states at a midpoint of the first simulation, wherein the number of the plurality of agents that is sorted into each state of the plurality of states is represented by a smaller amount of data than states of the plurality of agents; and a generation stage of generating characteristic data, wherein the characteristic data comprises the first simulation condition at the midpoint and a plurality of matrices, wherein each matrix of the plurality of matrices corresponds to one state of the plurality of predefined states, wherein elements of the each matrix comprise the number of the plurality of agents that is sorted into the one state of the plurality of predefined states; and predicting and outputting a result at an end point of the first simulation at the midpoint of the first simulation based on the characteristic data and the number of the plurality of agents that is sorted into the one state at the midpoint of the first simulation.

12. A non-transitory machine-readable storage medium encoded with instructions executable by a processor, the machine-readable storage medium comprising:

instructions to perform a first simulation that involves a plurality of agents under a first simulation condition;

instructions to sort the plurality of agents into a plurality of predefined states, wherein the plurality of predefined states comprises a plurality of different states, and to count a number of the plurality of agents that is sorted into each state of the plurality of predefined states at a midpoint of the first simulation, wherein the number of the plurality of agents that is sorted into each state of the plurality of states is represented by a smaller amount of data than states of the plurality of agents; and instructions to generate characteristic data, wherein the characteristic data comprises the first simulation condition at the midpoint and a plurality of matrices, wherein each matrix of the plurality of matrices corresponds to one state of the plurality of predefined states, wherein elements of the each matrix comprise the number of the plurality of agents that is sorted into the one state of the plurality of predefined states; and instructions to predict and output a result at an end point of the first simulation at the midpoint of the first simulation based on the characteristic data and the number of the plurality of agents that is sorted into the one state at the midpoint of the first simulation.

13. The non-transitory machine-readable storage medium according to claim 12, further comprising:

instructions to calculate a value based on the characteristic data, and to predict that the result of the first simulation is good when the value is at least equal to a preset threshold and that the result of the first simulation is bad when the value is less than the preset threshold.

14. The non-transitory machine-readable storage medium according to claim 13, further comprising:

instructions to learn from a plurality of pieces of characteristic data and a plurality of simulation results corresponding to the plurality of pieces of characteristic data.

15. The non-transitory machine-readable storage medium according to claim 14, further comprising:

instructions to interrupt the first simulation in response to a prediction that the result of the first simulation is bad.

16. The non-transitory machine-readable storage medium according to claim 15, wherein the instructions to interrupt change a level for interruption of the first simulation based on a predefined number of top-ranked value selected from a plurality of values obtained by completing a plurality of simulations under a plurality of simulation conditions.

17. The non-transitory machine-readable storage medium according to claim 15, wherein the instructions to interrupt the first simulation perform an interruption of the first simulation with a probability, wherein the probability depends on the value.

18. The non-transitory machine-readable storage medium according to claim 15, wherein, in response to an interruption of the first simulation, the instructions to interrupt make the instructions to perform the first simulation start a second simulation under a second simulation condition that is different from the first simulation condition.

19. The non-transitory machine-readable storage medium according to claim 18, wherein the instructions to predict calculate the value at an end point of the first simulation.

20. The non-transitory machine-readable storage medium according to claim 19, wherein the instructions to generate the characteristic generate the characteristic data at a plurality of points in time during the first simulation, and the instructions to predict calculate the value at the end point of the first simulation from the characteristic data at the plurality of points in time.

* * * * *